United States Patent
Fukuhara et al.

(10) Patent No.: US 6,658,158 B2
(45) Date of Patent: *Dec. 2, 2003

(54) WAVELET ENCODING METHOD AND APPARATUS AND WAVELET DECODING METHOD AND APPARATUS

(75) Inventors: Takahiro Fukuhara, Kanagawa (JP); Seiji Kimura, Chiba (JP); Hitoshi Kiya, 5-9-3-307, Minami-Ohsawa, Hachioji-Shi, Tokyo (JP)

(73) Assignees: Sony Corporation, Tokyo (JP); Hitoshi Kiya, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/472,293

(22) Filed: Dec. 27, 1999

(65) Prior Publication Data

US 2003/0198394 A1 Oct. 23, 2003

(30) Foreign Application Priority Data

Dec. 29, 1998 (JP) ............................................ 10-377713

(51) Int. Cl.[7] .............................. G06K 9/36; G06K 9/40
(52) U.S. Cl. ........................ 382/240; 382/233; 382/248; 382/268
(58) Field of Search ................................. 382/240, 232, 382/239, 268, 260, 248, 302, 233; 375/240.11

(56) References Cited

U.S. PATENT DOCUMENTS 6,229,926 B1 * 5/2001 Chui et al. .................. 382/240

FOREIGN PATENT DOCUMENTS

| JP | 05300489 | 11/1993 | .......... H04N/7/133 |
| JP | 09214967 A * | 8/1997 | ............ H04N/7/30 |
| WO | WO96/33474 | 10/1996 | ............. G06T/9/00 |

OTHER PUBLICATIONS ("Analysis/Synthesis Techniques for Subband Image Coding," Smith, M.J.T. et al., IEEE transactions on Acoustics, Speech, an Signal Processing, V. 38, No. 8, 1990, pp. 1446–1456.*

* cited by examiner

Primary Examiner—Wenpeng Chen
(74) Attorney, Agent, or Firm—Frommer Lawrence & Haug LLP; William S. Frommer; Darren M. Simon

(57) ABSTRACT

A wavelet encoding method and apparatus and a wavelet decoding method and apparatus for pictures. A input picture is split into plural tile pictures and wavelet transform is applied to input pictures on the tile picture basis to effect the encoding. For wavelet transform, pixels lying on the outer side of a given tile picture are symmetrically expanded and convolved. This enables marked memory capacity reduction, while eliminating constraint conditions for the number of times of wavelet splitting.

4 Claims, 19 Drawing Sheets

SPLITTING LEVEL=2

FIG.6A  ORIGINAL PICTURE
FIG.6B  SPLITTING INTO TILES
FIG.6C  TILE → WT → ENCODED BITSTREAM

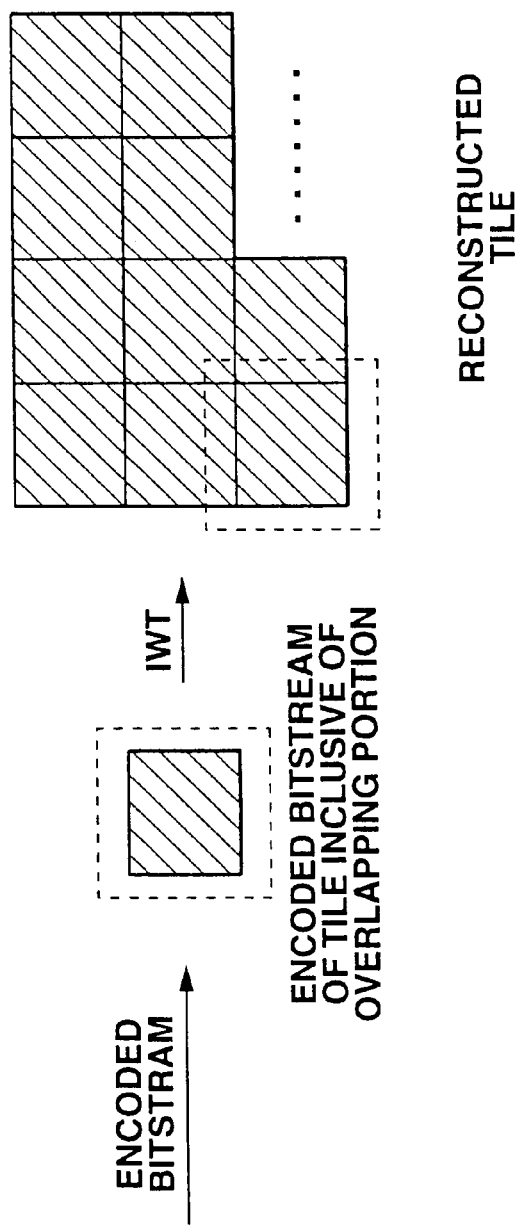

WAVELET ENCODING METHOD AND APPARATUS AND WAVELET DECODING METHOD AND APPARATUS

BACKGROUND OF THE INVENTION

1. Field of the Invention

This invention relates to a wavelet encoding method and apparatus and a wavelet decoding method and apparatus. More particularly, it relates to wavelet encoding employing tile-based wavelet transform for picture compression/expansion.

2. Description of the Related Art

Among conventional representative picture compression systems, there is a Joint Photographic Coding Experts Group (JPEG) standardized by the International Organization for Standardization (ISO). This JPEG system is the system for compression-encoding mainly still pictures using the discrete cosine transform (DCT) and is known to give an optimum encoded or decoded picture subject to use of a larger number of allocated bits. However, if, in this system, the number of encoding bits is reduced to a certain extent, block distortion proper to DCT becomes outstanding to render subjective deterioration apparent.

On the other hand, investigations in a system of splitting an image into plural bands by a filter combined from high-pass and low-pass filters, termed a filter bank, and of encoding the resulting signals from band to band, are going on currently. In particular, the wavelet transform is retained to be a promising new technique to take the place of DCT since the wavelet transform is free from the inherent defect of DCT that the block distortion becomes outstanding in case of high compression.

Nowadays, the JPEG system, MPEG (Moving Picture Image Coding Experts Group), or the digital video system is used in a major proportion of electronic products, such as electronic still cameras or video movies. These compression systems use DCT as the transform system. In near future, wavelet transform based products of the above type will make their debut on the market. Also, investigations are going on briskly in various research institutions for improving the efficiency of the encoding system. In fact, in JPEG2000, which is currently worked on by ISO/IEC/JTCI SC29/WG1, as the same organization as JPEG, and which is thought to be a promising next-generation international still picture standard system, as a successor to JPEG, wavelet transform is anticipated to be used in preference to the pre-existing DCT of JPEG as a basic transform system for picture compression.

In the above-described wavelet transform, it is usually necessary to apply wavelet transform to the entire picture and to store the produced wavelet transform coefficients transiently in a memory. Thus, if the picture size is larger, an extremely large memory capacity is required, which is inconvenient for an apparatus with a limited memory capacity, such as an electronic still camera, video camera recorder or a so-called personal digital assistant (PDA).

SUMMARY OF THE INVENTION

It is therefore an object of the present invention to provide a wavelet encoding method and apparatus and a wavelet decoding method and apparatus in which the size of the memory capacity, retained to be problematical in effecting high efficiency compression by wavelet transform, can be decreased, and which is able to realize high compression efficiency.

In one aspect, the present invention provides an wavelet encoding apparatus including means for splitting an input picture into a plurality of tile pictures, means for applying wavelet transform from one tile picture to another, means for scanning wavelet transform coefficients, means for quantizing wavelet transform coefficients, quantizing as-scanned quantization coefficients, and means for entropy encoding the quantization coefficients to output an encoded bitstream, wherein the wavelet transform means includes means for symmetrically expanding pixels in a given tile picture within a range outside the tile picture influenced by filtering, and for executing convolution.

In another aspect, the present invention provides a wavelet encoding method comprising the steps of splitting an input picture into a plurality of tile pictures, applying wavelet transform to the input picture from one tile picture to another, scanning wavelet transform coefficients, quantizing as-scanned wavelet transform coefficients and entropy encoding the quantization coefficients to output an encoded bitstream, wherein the wavelet transform step includes a step of symmetrically expanding pixels in a given tile picture to a range outside the tile picture influenced by filtering, and of executing convolution.

In still another aspect, the present invention provides a wavelet decoding apparatus including means for being fed with or reading out an encoded bitstream for entropy decoding the encoded bitstream, means for dequantizing produced quantization coefficients, means for back-scanning the produced quantization coefficients to restore the original sequence of coefficients, means for inverse wavelet transforming back-scanned coefficients to generate tile pictures and means for synthesizing produced tile pictures to furnish an ultimate output picture.

In still another aspect, the present invention provides a wavelet decoding method comprising the steps of being fed with or reading out an encoded bitstream for entropy decoding the encoded bitstream, dequantizing produced quantization coefficients, back-scanning the produced quantization coefficients to restore the original sequence of coefficients, inverse wavelet transforming back-scanned coefficients to generate tile pictures and synthesizing produced tile pictures to furnish an ultimate output picture. In yet another aspect, the present invention provides a wavelet encoding/decoding apparatus for splitting an input picture into a plurality of tile pictures, wavelet encoding the input picture from one tile picture to another to generate an encoded bitstream and for wavelet decoding the encoded bitstream. The wavelet transform means includes means for symmetrically expanding and convolving wavelet transform coefficients in the inside of a given tile picture to a range outside the tile picture affected by filtering, there being no overlapping area between the pre-set tile picture and neighboring tile picture(s). The inverse wavelet transform means, as counterpart means of the wavelet transform means, includes means for symmetrically expanding and convolving the wavelet transform coefficients in the inside of the pre-set tile picture or means for setting the wavelet transform coefficients in a range outside the pre-set tile picture affected by filtering all to 0 and for effecting convolution.

In the tile picture wavelet encoding method and apparatus according to the present invention, an input picture is split into plural tile pictures and wavelet transform is applied from one tile picture to another. The wavelet transform coefficients then are scanned, and the as-scanned coefficients are entropy-encoded to output an encoded bitstream. Also, in the wavelet transform, pixels on an outer periphery of the tile picture are symmetrically expanded and convolved, thus realizing encoding/decoding with significant memory space reduction as compared to a system in which wavelet transform is applied to the entire picture. Also, there is no constraint condition concerning the number of wavelet splitting which has posed problems in overlap tile-based wavelet encoding, thus realizing a high encoding efficiency at all times.

Moreover, if it is desired to decode only a specified tile picture, decoding can be realized completely independently of neighboring tile(s) by combining wavelet transform means applying symmetrical pixel expansion and convolution with inverse wavelet transform means applying counterpart symmetrical wavelet transform coefficient expansion and convolution.

If wavelet transform means employing integer precision wavelet filter is used, inverse wavelet transform means not accompanied by overlap is used, so that there is no necessity of adding rounding error at the time of filtering and hence the distortion in the vicinity of the tile picture is not apparent.

In the present wavelet decoding method and apparatus, an encoded bitstream is inputted or read out and entropy-decoded to produce quantization coefficients, which then are dequantized to produce transform coefficients. These transform coefficients are back-scanned to restore the sequence of original coefficients. The back-scanned coefficients are inverse wavelet transformed to generate tile pictures, which then are synthesized to furnish an ultimate output picture. After inverse wavelet transform, wavelet transform coefficients in the inside of the tile picture are symmetrically expanded and convolved. Alternatively, wavelet transform coefficients outside the tile pictures affected by filtering are all set to 0 and convolved to enable inverse transform and decoding independently of neighboring tile pictures. This gives a desirable result that deterioration in the boundary portions between neighboring tile pictures can hardly be perceived in a higher bitrate (low compression ratio). It should be noted that linear convolution has a desirable feature that smooth junction can be achieved in the boundary portions between neighboring tile pictures under the effect of linear interpolation by wavelet filter which may be achieved by setting the coefficients in the boundary portions to zero. Also, in the inverse wavelet transform means, since there is no necessity of reading out wavelet transform coefficients of the neighboring tile pictures in an overlapped fashion, a given tile picture can be inverse-transformed and decoded independently of the neighboring tile pictures.

Thus, according to the present invention, high efficiency encoding and high quality decoding can be achieved since both the features of high quality under high compression and partial tile picture decoding can be achieved and wavelet transform means can be matched to inverse wavelet transform means.

BRIEF DESCRIPTION OF THE DRAWINGS

FIGS. 15A and 15B illustrate the concept of overlap type tile-base wavelet decoding.

DESCRIPTION OF THE PREFERRED EMBODIMENTS

Figure 1:
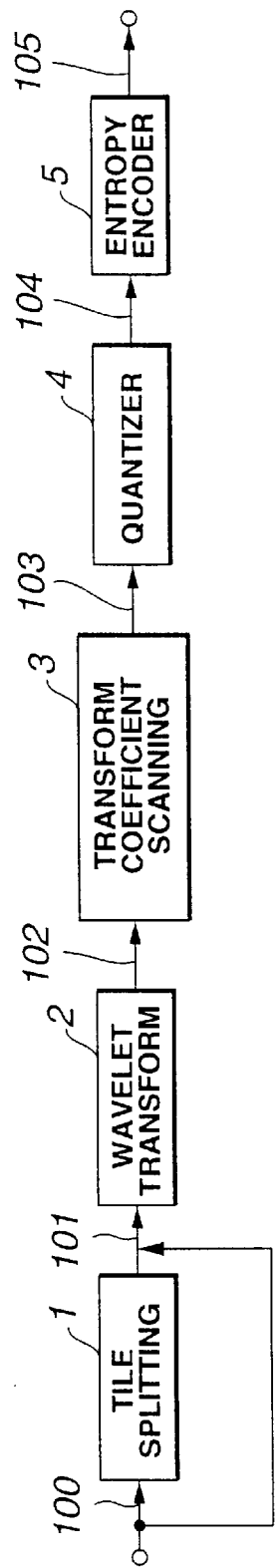
FIG. 1 is a block diagram showing a schematic structure of a wavelet encoding system for a picture as a first embodiment of the present invention.

Referring to the drawings, preferred embodiments of a wavelet encoding method and apparatus and a wavelet decoding method and apparatus according to the present invention will be explained in detail.

A tile-base wavelet encoding apparatus, shown in FIG. 1, includes a tile splitting unit 1 for splitting an input picture 100 into plural tiles, a wavelet transform unit 2 for applying wavelet transform on the tile picture basis, a transform coefficient scanning unit 3 for scanning the wavelet transform coefficients, a quantization unit 4 for quantizing coefficients following scanning and an entropy encoding unit 5 for entropy-encoding quantization coefficients to output the resulting encoded bitstream. The wavelet transform unit 2 includes convolution means for applying convolution with symmetrical extension of pixels within a tile to a filtering-affected area outside the tile, as will be explained subsequently.

In the tile-based wavelet encoding device, shown in FIG. 1, the input picture 100 is inputted first to the tile splitting unit 1 where it is split into plural tile pictures 101. The tile pictures 101 then undergoes wavelet transform in the wavelet transform unit 2 to produce wavelet transform coefficients 102 which are inputted to the transform coefficient scanning unit 3. The transform coefficient scanning unit 3 performs scanning of the wavelet transform coefficients. It is assumed here that the wavelet transform coefficients are scanned from left to right (in the horizontal direction) and from up to down (in the vertical direction).

The as-scanned transform coefficients 103 are quantized by a quantizer 4 to output resulting quantization coefficients 104. As quantization means, the routinely used scalar quantization, shown by the following equation (1):

$$Q = x/\Delta \quad (1)$$

where x and $\Delta$ denote wavelet transform coefficients and the quantization index values, respectively, may be used.

The quantization coefficients 104 from the quantizer 4, obtained by scalar quantization, are entropy-encoded by the entropy encoding unit 5 to output an encoded bitstream 105. Meanwhile, arithmetic encoding means may be used in addition to the variable encoding means in the entropy encoding unit 5. These entropy encoding means are investigated by many research institutes and reports have been made on the results of the investigations. Therefore, these reports may be referred to in using the entropy encoding means.

The foregoing is the basic structure and operation of the wavelet encoding device according to a first embodiment of the present invention. Meanwhile, if the picture is of a sufficiently small size or a large number of memories are loaded on the device, it is sufficient if the input picture 100 is directly wavelet transformed by the routine processing in the wavelet transform unit 2 without splitting the picture into tiles.

The wavelet transform unit 2 includes convolution means for applying convolution with symmetrical extension of pixels within the tiles to a filtering-affected range outside the tile. However, before proceeding to detailed description in this respect, the structure and the operation of a routine wavelet transform unit is explained.

Figure 2:
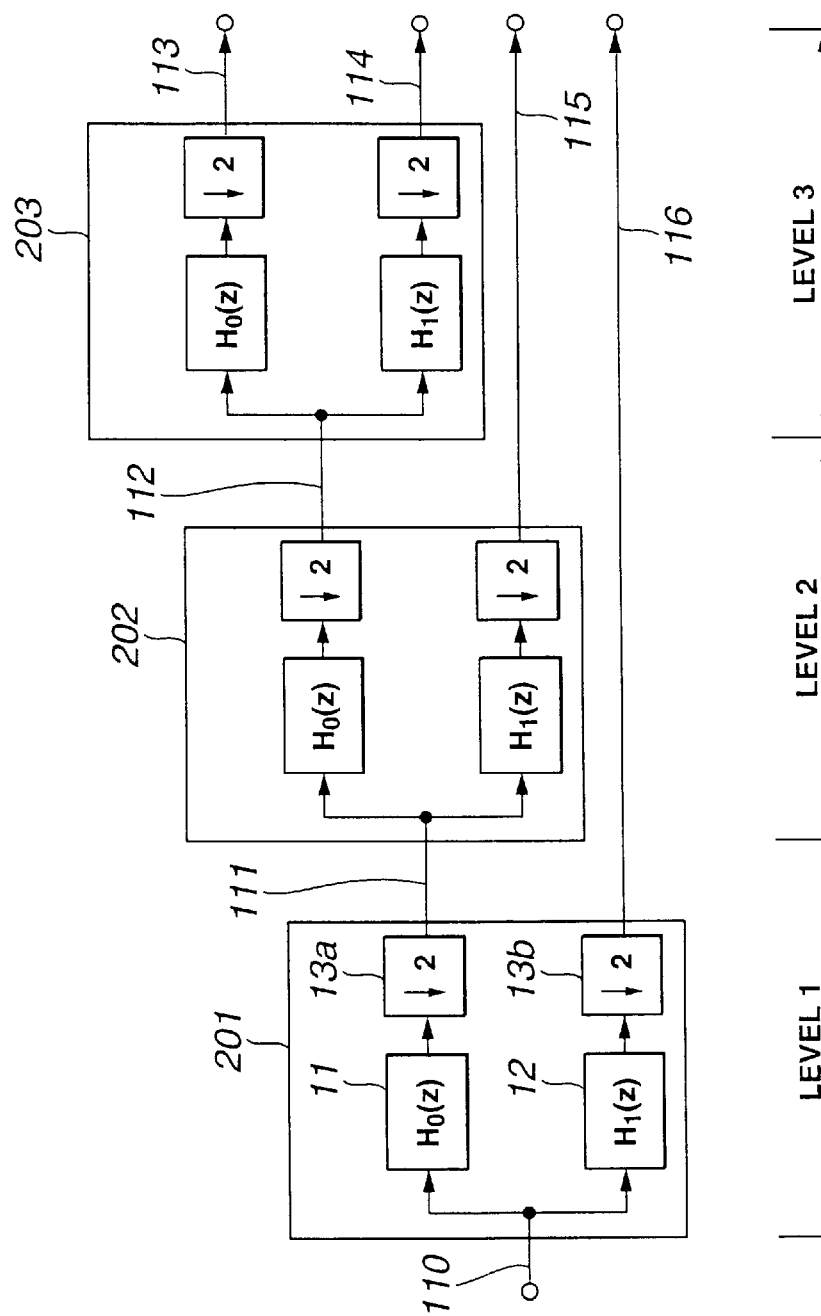
FIG. 2 is a block diagram showing a schematic structure (up to level 3) of the usual wavelet transform unit.

FIG. 2 shows the structure of a routine wavelet transform unit, that is a structure in which octave splitting, which is the most common technique of wavelet transform, is performed over plural levels. In the case of FIG. 2, the number of levels is three (level 1 to level 3), picture signals are split into a low range and a high range, and only low-range components are hierarchically split. Although wavelet transform is shown in FIG. 2 in connection with one-dimensional signals, for example, horizontal components of a picture, two-dimensional picture signals can be coped with by extension to two-dimensional signals.

The operation of the unit is hereinafter explained.

An input picture signal 110 to the wavelet transform unit, shown in FIG. 2, is split by a low-pass filter 11, with a transfer function $H_0(z)$, and a high-pass filter 12, a transfer function $(H_1(z))$. The resulting low and high frequency components are decimated by associated downsamplers 13a, 13b to a resolution of ½ (level 1). There are two outputs at this time, namely a L-component 111 and a H-component 116, where L and H denote low and high, respectively. The low-pass filter 11, high-pass filter 12 and the two downsamplers 13a, 13b, shown in FIG. 2, constitute a level 1 circuit unit 201.

Only low-range components of the signals, decimated by the downsamplers 13a, 13b, that is only signals from the downsampler 13a, are band-split by the low-pass filter and the high-pass filter of a level 2 circuit unit 202, and are decimated by associated downsamplers to a resolution of ½ (level 2). The level 2 circuit unit 202, made up of the low-pass filter and the downsamplers of the level 2, is constituted similarly to the level 1 circuit unit 201, made up of the low-pass filter 11, high-pass filter 12 and the downsamplers 13a, 13b of the level 1.

By performing this processing to a pre-set level, band components obtained on hierarchically band-splitting the low-range components are sequentially generated. The band components, generated in the level 2, are a LL component 112 and a LH component 115. In FIG. 2, showing an example of band-splitting up to a level 3, an output of the downsampler on the low-pass filter side of the level 2 circuit unit 202 is routed to a level 3 circuit unit 203 constructed similarly to the level 1 circuit unit 201. By splitting the spectrum up to the level 3, in this manner, a LLL component 113, a LLH component 114, a LH component 115 and a H component 116 are generated.

Figure 3:
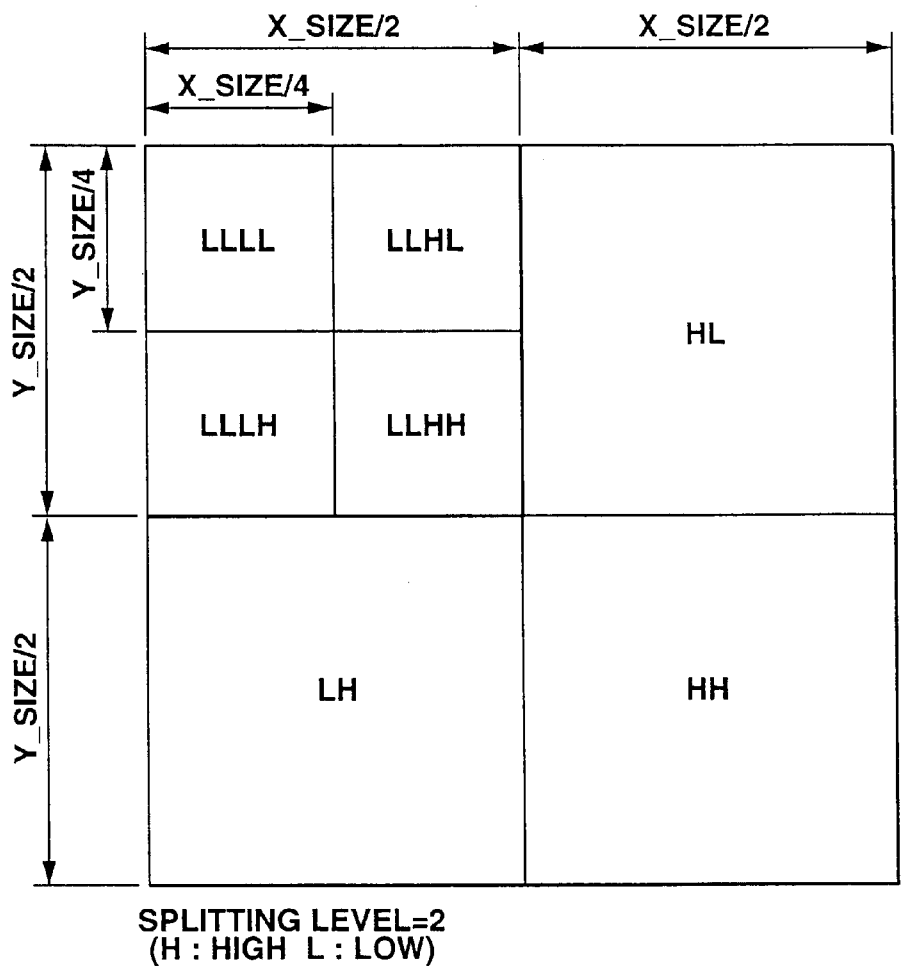
FIG. 3 is a diagrammatic view showing band splitting of a two-dimensional picture (splitting level=2).
Figure 4:
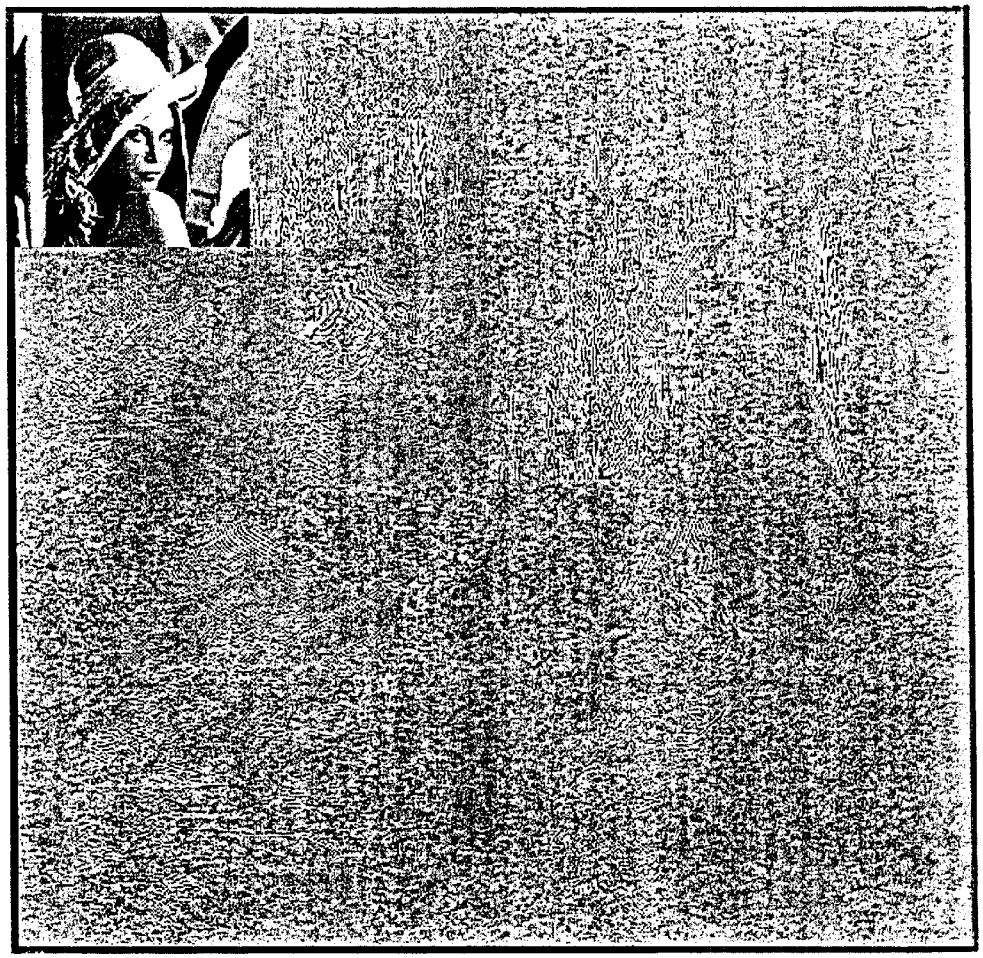
FIG. 4 illustrates respective band pictures in case the spectrum of a real picture is split is split (splitting level=2).

FIG. 3 shows band components obtained on band-splitting a two-dimensional picture up to the level 2. The notation of L and H in FIG. 3 differs from that for L and H in FIG. 2 for the one-dimensional signals. That is, in FIG. 3, level 1 band splitting (in the horizontal and vertical directions) gives four components LL, LH, HL and HH, where LL denotes that the horizontal and vertical components are both L, while LH denotes that the horizontal component is H and the vertical component is L. The LL component is again band-split to generate LLLL, LLHL, LLLH and LLHH. FIG. 4 shows an illustrative picture in which band splitting of FIG. 3 is applied to an actual picture. It is seen from this figure that the majority of the information is contained in the low-range components.

Figure 5:
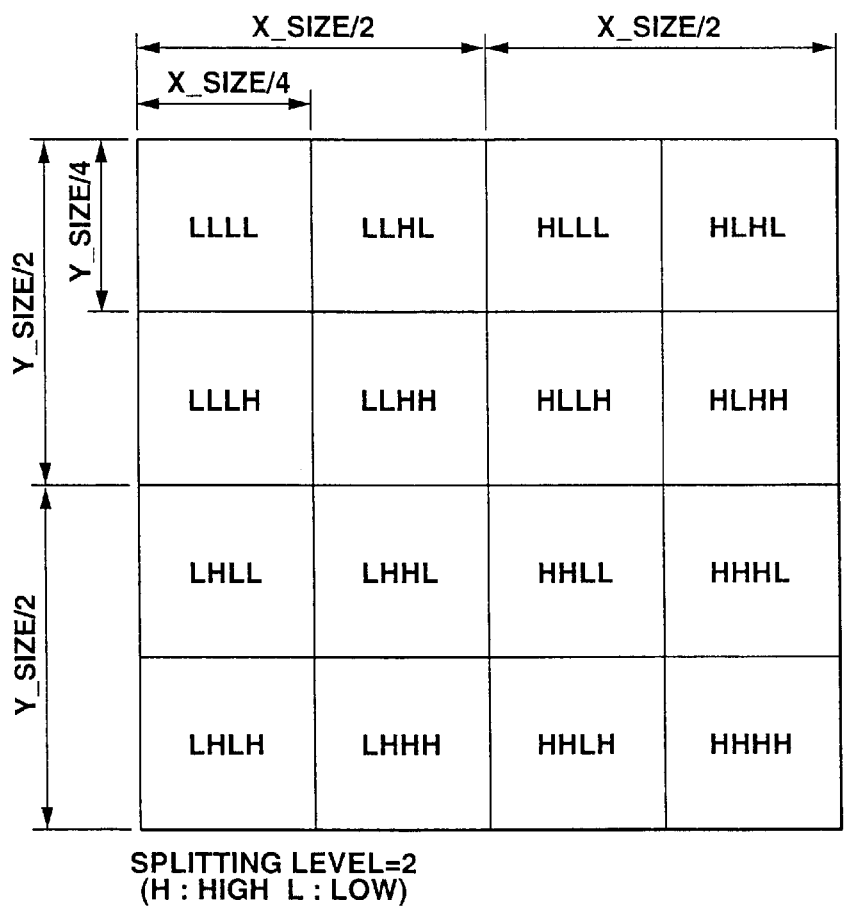
FIG. 5 is a diagrammatic view showing splitting of the entire spectrum in equal portions (splitting level=2).

In addition to hierarchically splitting the low-range components, the entire frequency spectrum is also split uniformly. Specifically, FIG. 5 shows an illustrative picture in case the totality of band components are split uniformly. The components LH, HL and HH in FIG. 3 are again band-split in the horizontal and vertical directions so that LHLL, LHHL, LHLH and LHHH components are generated from the LH component, whilst HLLL, HLHL, HLLH and HLHH components and HHLL, HHHL, HHLH and HHHH components are generated from the HL and HH components, respectively.

Figure 6:
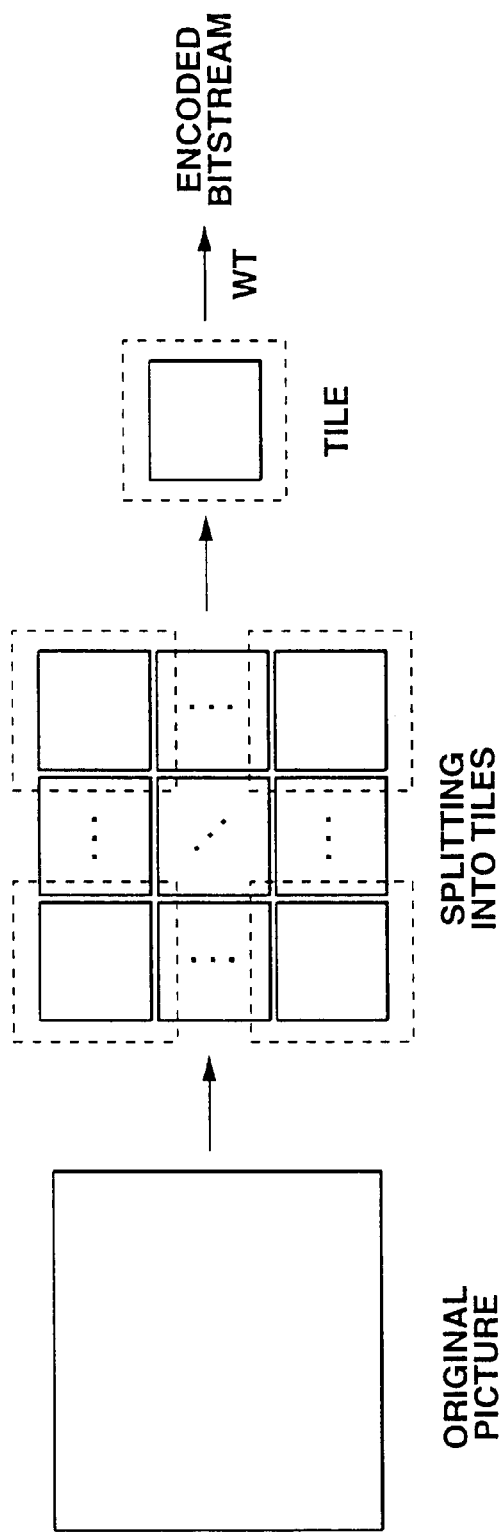
FIGS. 6A, 6B and 6C illustrate the concept of encoding of the overlap type tile base wavelet encoding.

Then, Referring to FIG. 6, the overlap tile-based wavelet encoding is explained.

An original picture, shown in FIG. 6A, is split into plural tile pictures shown in FIG. 6B. Up to this point, the operation is similar to that of the previous embodiment. In the present overlap tile-based wavelet encoding, filtering is performed up to pixels in an area overlapping with a neighboring tile picture, as indicated by broken lines in FIG. 6B. That is, in a given tile, filtering is performed on an area surrounded by a broken line C in FIG. 6, so that an encoded bitstream is produced by wavelet transform. Thus, if a particular tile only is to be decoded, it is necessary to perform inverse wavelet transform on an overlapped neighboring tile portion and to add pixels of the overlapped portion and hence completely independent decoding cannot be achieved.

Figure 7:
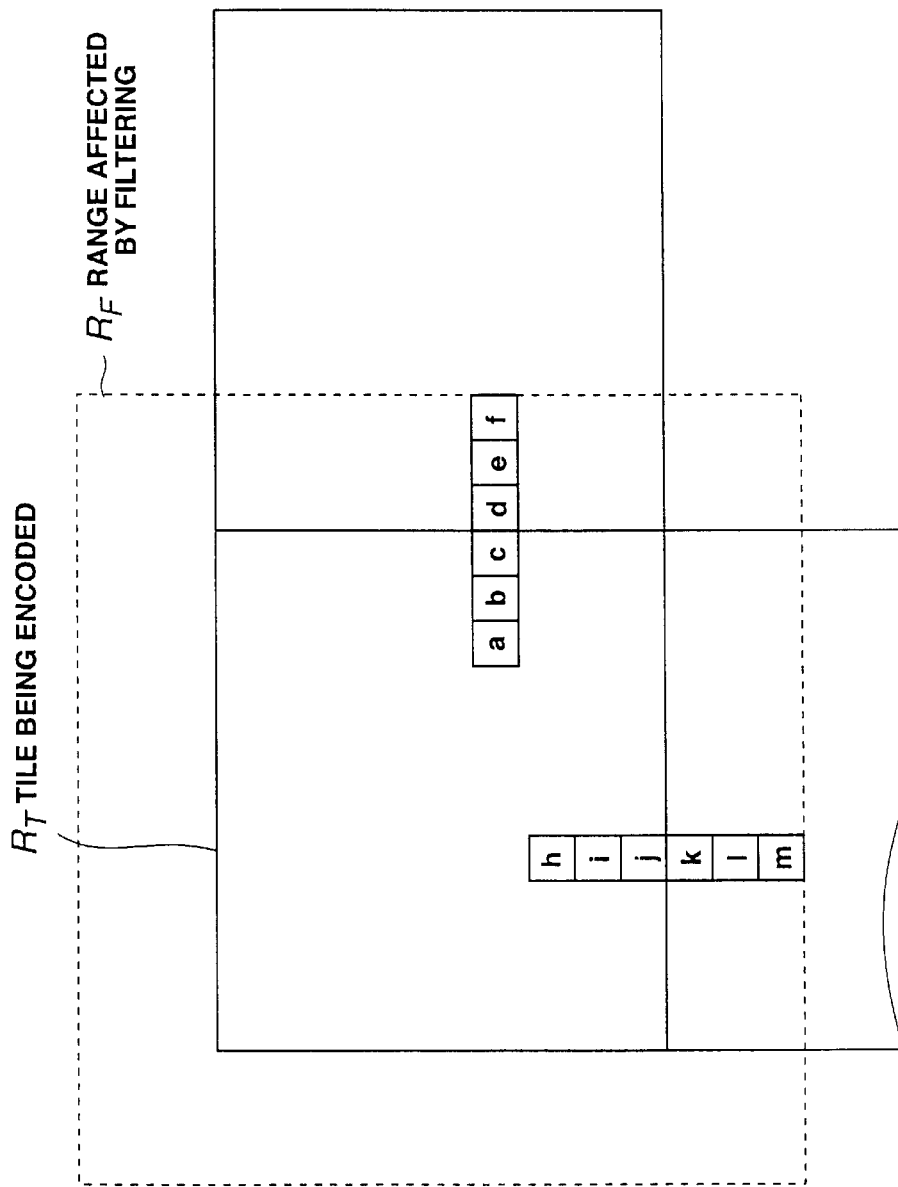
FIG. 7 is a diagrammatic view showing the operation of convolution used in overlap wavelet encoding.
Figure 8:
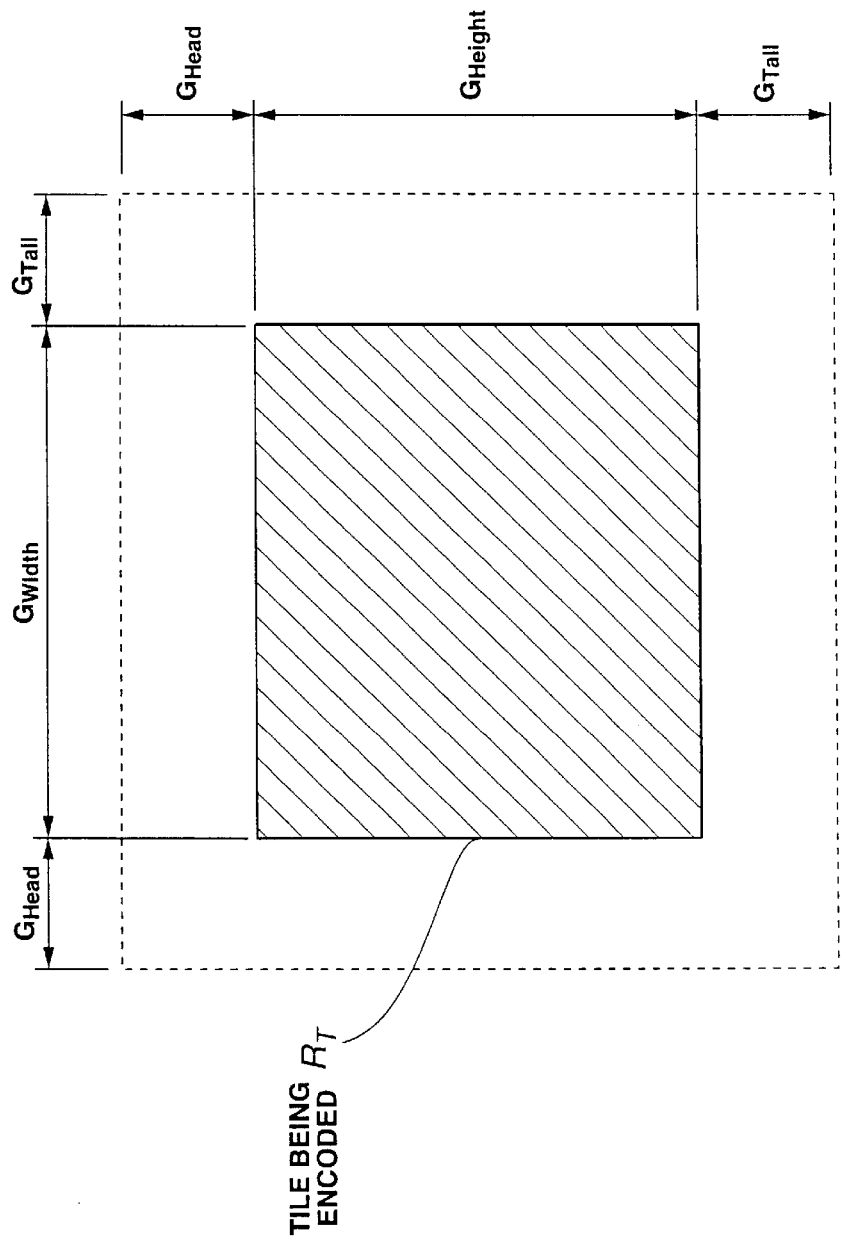
FIG. 8 is a diagrammatic view showing an area to be encoded and an overlap area.

FIG. 7 shows a tile $R_T$ to be encoded and a range $R_F$ affected by filtering on the occasion of the overlap tile-based wavelet encoding. In FIG. 7, a, b, c, d, e, f, h, i, j, k, l and m all denote pixels. For example, if the pixel c is being filtered in the horizontal direction, the three pixels d, e and f are read out from neighboring right-side tile picture and pre-set filter coefficients are convolved thereon. Similarly, if the pixel j is being filtered in the horizontal direction, the three pixels k, l and m are read out from neighboring lower-side tile picture and pre-set filter coefficients are convolved thereon. FIG. 8 shows an overlap area on the occasion of effecting the overlap tile-based wavelet encoding. In FIG. 8, areas $C_{HEAD}$, $C_{TAIL}$ in the horizontal and vertical directions indicate overlap areas outside a tile being encoded. The filtering on pixels in this area has already been discussed with reference to FIG. 7. What is at issue in the currently experimented overlap tile-based wavelet encoding is that limitations are imposed on the number of splitting in the wavelet splitting due to the filter tap length because the overlap area is necessitated.

For example, if a filter with 9 horizontal taps and 7 vertical taps, frequently used as a wavelet filter, and the tile size is set to 64×64, only wavelet splitting up to four is tolerated. Similarly, if a filter with 13 horizontal taps and 7 vertical taps is used as a wavelet filter, only wavelet splitting up to three is allowed. Obviously, the reason is that, if splitting is done beyond three, an overlap area affected by filtering becomes larger than the tile size. That is, with a filter with 13 horizontal taps, six pixels on both sides of a center pixel represents a filtering-affected pixel area, so that 64×64 tiles split thrice become 8×8 so that all pixels of the tile picture being encoded can be filtered within the range of the neighboring tile picture. However, on splitting once more, the tile picture size is 4×4, so that, if six pixels are to be taken about the pixel with the pixel on the boundary position of the tile picture being encoded as center, the extent of the neighboring tile picture (4×4 pixels) is exceeded such that filtering range is exceeded.

In the overlap tile-based wavelet encoding, the following various problems are encountered. That is, (i) since boundary portions of neighboring tiles are overlapped, limitations are imposed on the number of wavelet splitting by the filter length of the wavelet filter; and (ii) on the decoder side, neighboring tile portions need to be decoded simultaneously even though a specified tile portion is to be decoded. This appreciably influences the encoding efficiency and hence represents a problem that needs to be solved. There is also a problem if an integer wavelet filter is used, that is, (iii) since the encoder side cannot be matched to the decoder side, an error in an overlap area is increased and detected as an error if the compression ratio is increased.

In this consideration, in an embodiment of the present invention, pixels in the tile are symmetrically expanded and convolved within a range outside the tile influenced by filtering to overcome the problems (i) and (ii).

A wavelet encoding device, as a second embodiment of the present invention, is hereinafter explained. Although the overall structure of the present second embodiment is similar to the wavelet encoding device shown in FIG. 1, the wavelet transform unit 2 of FIG. 1 is of a more specified structure. The operation of the wavelet transform unit 2 is now explained with reference to FIGS. 9 and 10. In the present second embodiment, there is no overlap area between two neighboring tile pictures. Within an area outside the tile affected by filtering, wavelet transform coefficients inside the tile are symmetrically expanded and convolved.

Figure 9:
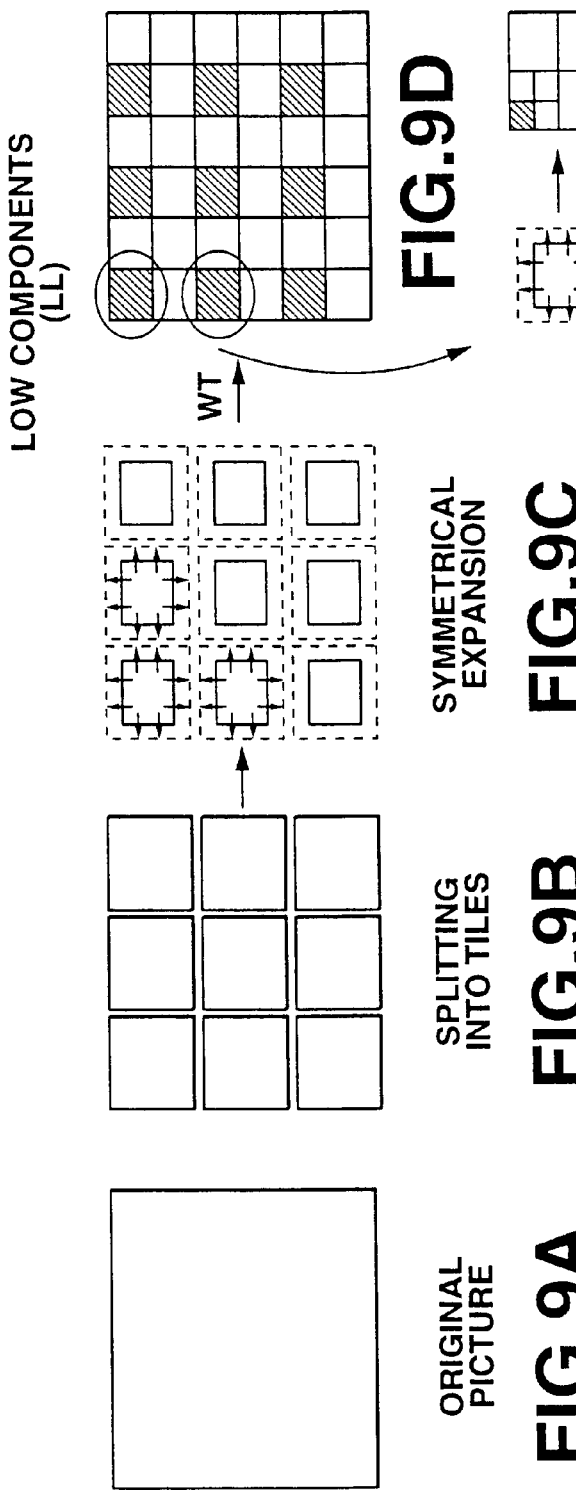
FIGS. 9A, 9B, 9C, 9D, 9E and 9F illustrate the concept of wavelet encoding by symmetrical pixel convolution.

FIG. 9 illustrates the concept of wavelet encoding by symmetrical convolution. The original picture, shown in FIG. 9A, is split into tile pictures, as shown in FIG. 9B. Then, symmetrical pixel expansion is effected, from one tile picture to another, in an area outside the tile up to an area RF influenced by filtering, as indicated by broken lines in FIG. 9C.

Figure 10:
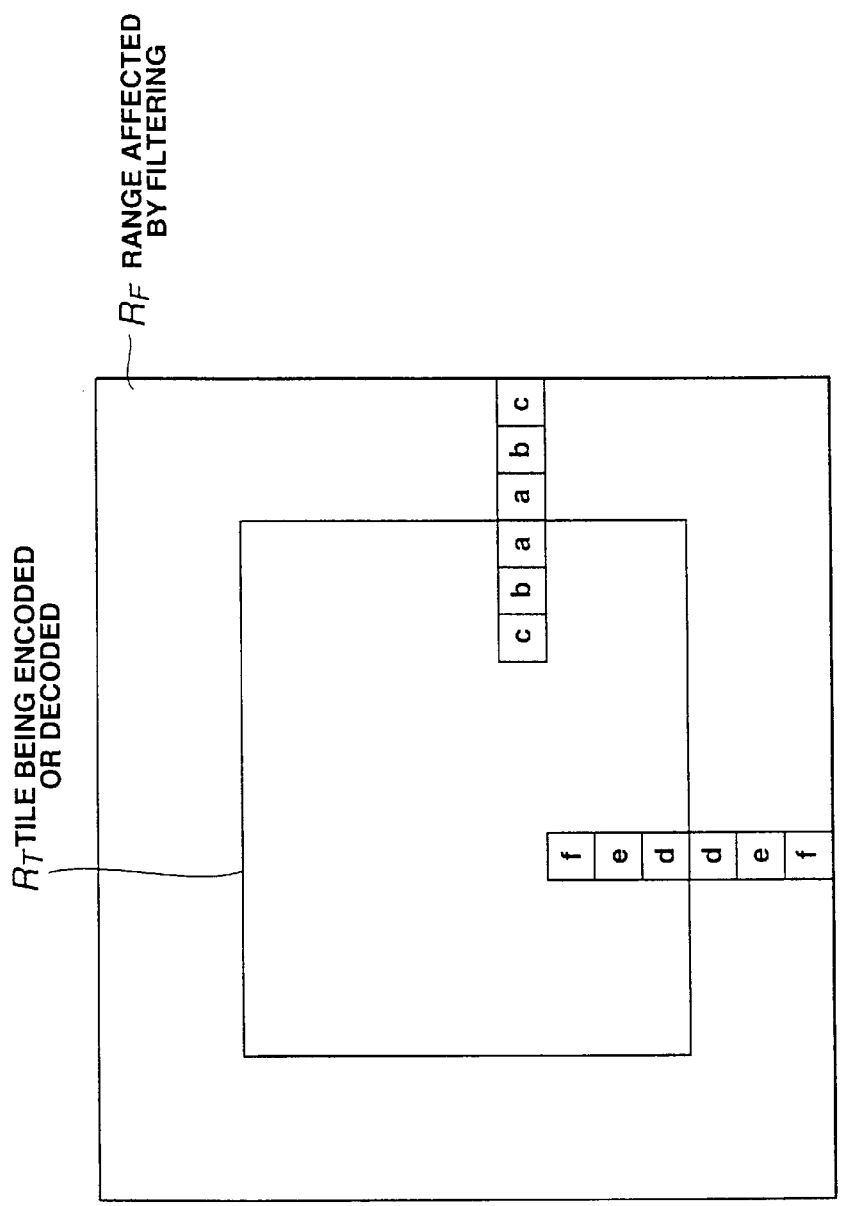
FIG. 10 is a diagrammatic view for illustrating the concept of symmetrical convolution.

FIG. 10 specifically, shows this expansion. It may be seen from this figure that a pixel string of pixels c, b, a in the horizontal direction in a tile area $R_T$ being encoded or decoded is expanded symmetrically in the arraying order of a, b, c, with the tile boundary as an interface, up to the range RF influenced by filtering. Similarly, in the vertical direction, a pixel string of f, e, d in the tile area $R_T$ is expanded symmetrically in the arraying order of d, e, f, with the tile boundary as an interface, up to the range RF influenced by filtering. It has been known that, if this mirrored symmetrical expansion is made, the number of wavelet transform coefficients generated is only as many as the number of pixels in the tile picture. That is, redundancy is advantageously eliminated.

Then, wavelet transform (WT) is applied to each tile of FIG. 9C, obtained on symmetrical expansion. The result is that each tile is split into, for example, four band components, as already explained with reference to FIG. 3 (see FIG. 9D). In FIG. 9D, shaded portions represent the above-mentioned LL components. The tile of the low-range components of the shaded portion is symmetrically expanded in similar fashion and processed with wavelet transform (WT), as shown in FIG. 9E. Similar operations then are carried out up to a pre-set wavelet splitting number. The foregoing is the explanation on the operation of wavelet transform in the second embodiment of tile-based symmetrical expansion.

A third embodiment of the present invention is now explained.

The present third embodiment is directed to wavelet encoding for a picture employing an integer precision filter in turn employing lifting means as a low-pass filter and a high-pass filter configured for implementing the above-mentioned wavelet transform. This embodiment includes an integer precision filter and lifting means as wavelet transform means. It is possible to omit quantization means to effect loss-free compression.

The third embodiment of the present invention, employing integer precision wavelet transform employing lifting means (IWT) is explained with reference to FIG. 11. Meanwhile, the term "lifting" is derived from an operation of adding or subtracting filtered coefficients from the low side and from the high side to the counterpart sides.

Figure 11:
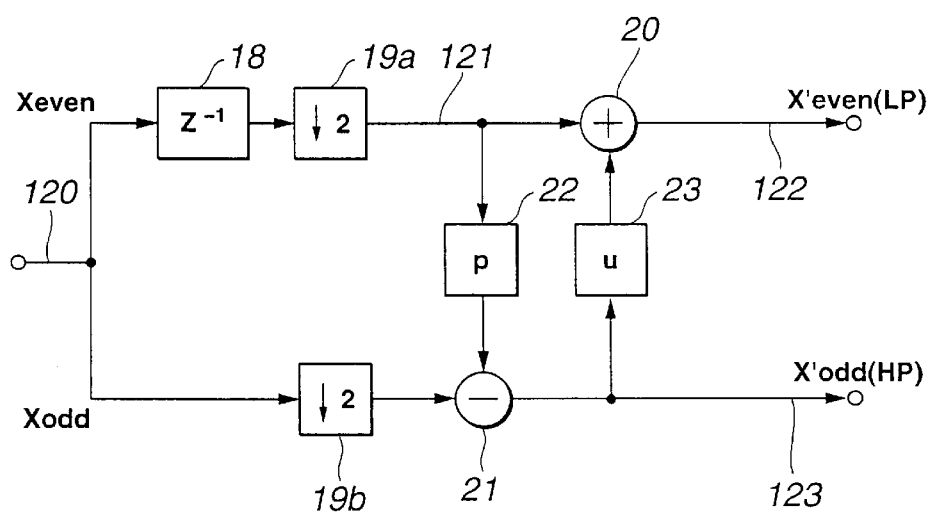
FIG. 11 is a block diagram showing a schematic structure of an integer precision type wavelet transform unit.

The circuit shown in FIG. 11 is used as a circuit 201, 202 or 203 for one level, shown in FIG. 2. In this figure, the pixels of the input signal 120 are divided into even-numbered pixels Xeven and odd-numbered pixels Xodd. The even-numbered pixels Xeven are delayed by a delay unit 18 and lowered in resolution by ½ by a ½ downsampler 19a to generate an output signal 121 which is routed to an adder 20. On the other hand, an odd-numbered pixel Xodd is lowered in resolution by ½ by a ½ downsampler 19b and routed to a subtractor 21. The output signal 121 is filtered by a filter 22 with a coefficient string p to produce a filtered output. A difference between this filter output and an output of the odd-numbered pixel Xodd obtained via downsampler 19b is computed by a difference taking unit 21. An output signal 123 of the difference taking unit 21 is routed as an output of the high-range side, that is as an output of the high-pass side. On the other hand, the output signal 123 is filtered by a filter 23 with a coefficient string u to give a filtered output which is added by an adder 122 to the above output signal 121 to give a sum output signal 122 which is routed as an output signal 122 of the low-range side, that is as a low-pass side output.

The filter coefficients p, u are hereinafter explained. The integer precision wavelet transform (IWT) has outstanding properties that, if, for example, a low-pass filter is of 9 taps and a high-pass filter is of 7 taps, a 4-tap filter 22 of the coefficient string p and a 2-tap filter 23 of a coefficient string u suffice, such that $$p=(-1, 9, 9, -1)/16$$

$$u=(1, 1)/4$$

suffice and that, since divisors are each powers of 2, that is $16=2^4$ and $4=2^2$, division can be performed by bit shifting.

At this time, the respective filter coefficients of the low-pass filter and the high-pass filter are equivalent to low=(1, 0, −8, 16, 46, 16, −8, 0, 1)/64 high=(1, 0, −9, 16, −9, 0, 1)/16.

However, since the filter coefficients are integers, rounding (counting fractions over ½ as one and disregarding the rest) is used in filtering with actual pixels in order to raise the accuracy in computation. If a pixel string (a, b, c, d) is filtered by the above filter with the coefficient string p, an operation round($a*(-1)+b*9+c*9+d*(-1)$).

where round(x) denotes counting fractions over ½ as one and disregarding the rest, is executed. Thus, there is a risk that a rounding error be produced. This rounding error can be removed by employing wavelet decoding as explained in an eleventh embodiment as later explained.

A fourth embodiment of the present invention is now explained.

The present fourth embodiment arrays the codelength of an output encoded bitstream of wavelet encoding of a picture to store and hold the codelength. Meanwhile, this is required as an encoder side condition in partially decoding a specified tile in a picture of the encoded bitstream sent to the decoder side.

Figure 12:
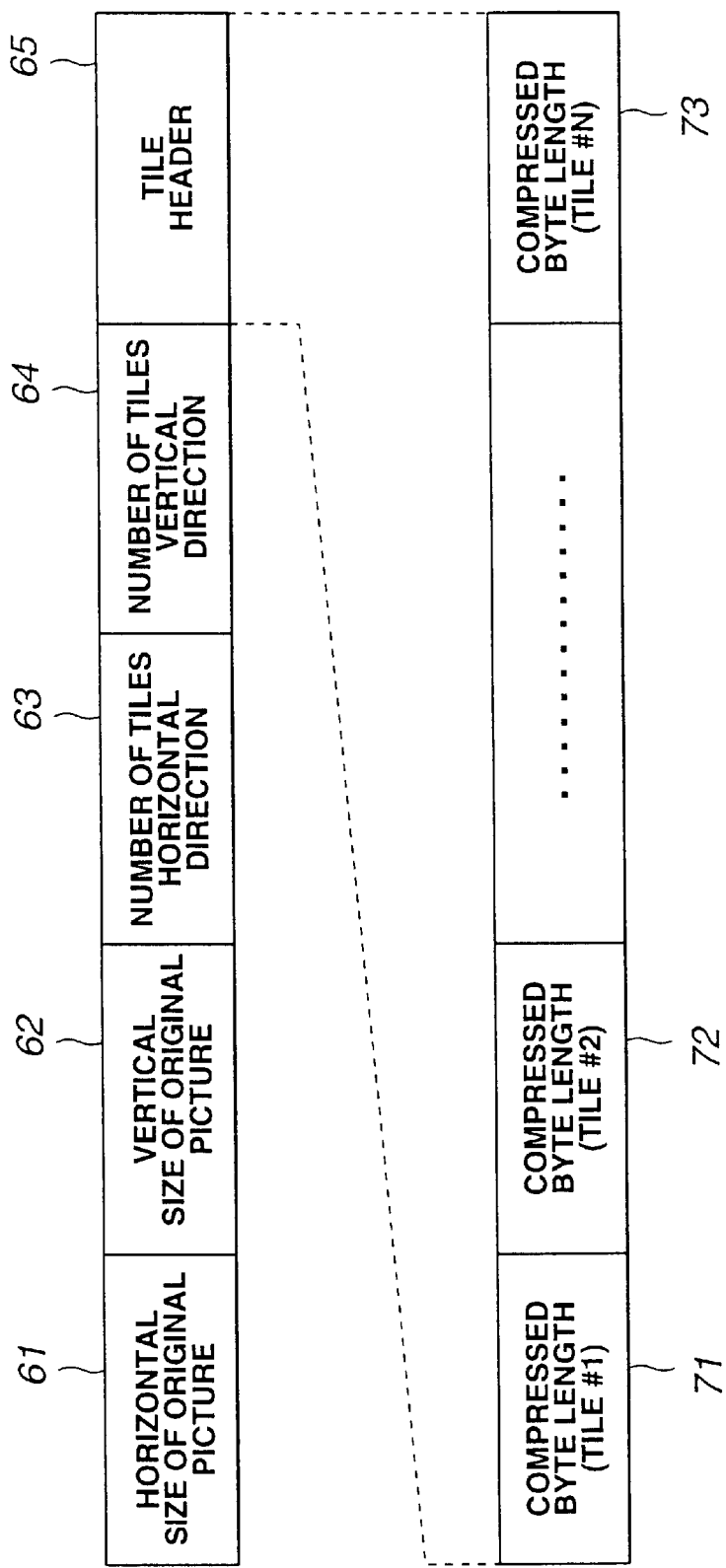
FIG. 12 illustrates the header information used for tile base encoding means.

Referring to FIG. 12, the present fourth embodiment is explained.

FIG. 12 shows an illustrative structure of an encoded bitstream comprised of the horizontal size information 61 of the original picture, vertical size information 62 of the original picture, number-of-tile information 63 in the horizontal direction, number-of-tile information 64 in the vertical direction and a tile header 65, beginning from the leading end. The tile header 65 stores and holds the code length on the tile basis, such as the length of the compressed byte. In the embodiment of FIG. 12, there are arrayed the compressed byte length information 71 for the tile #1, compressed byte length information 72 or the tile #2, . . . , compressed byte length information 73 for the tile #N. In this case, if desired to decode only a certain tile on the decoder side, it can be instantly be comprehended from which position in the entire encoded bitstream to readout the codeword, so that there is no necessity of reading out and decoding from the outset, thus realizing high operating efficiency and saving in the memory.

A fifth embodiment of the present invention is hereinafter explained.

In the present fifth embodiment, the number of times of splitting for wavelet encoding of a picture in case the low-range components are hierarchically split or the entire spectrum is uniformly split is determined by external inputting means.

Taking an example of the wavelet encoding device shown in FIG. 1, an external signal specifying the number of times of splitting is fed to the wavelet transform unit 2 to effect wavelet splitting over a pre-set number of times. This realizes an advantage that, depending on characteristics of an input picture, the compression efficiency can possibly be changed appreciably by the number of times of wavelet splitting, and that, if an optimum number of times of splitting is determined by some external input, efficient encoding can be achieved at all times.

A sixth embodiment of the present invention is hereinafter explained.

The present embodiment is directed to a configuration of a wavelet decoding method and a wavelet decoding device for an encoded bitstream obtained on wavelet encoding for a picture described above.

Figure 13:
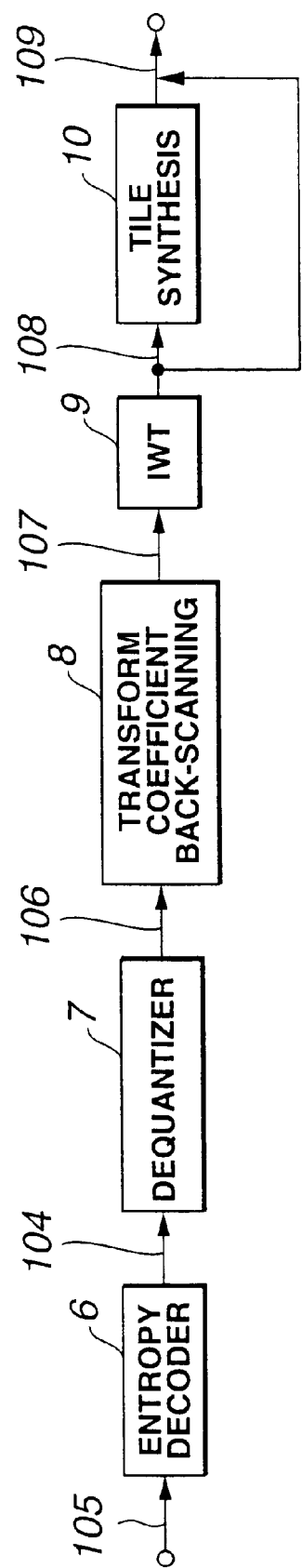
FIG. 13 is a block diagram showing a schematic structure of a wavelet decoding apparatus for a picture according to a sixth embodiment of the present invention.

FIG. 13 shows a block diagram showing a schematic structure of the wavelet decoding device according to the sixth embodiment and is a counterpart of the wavelet encoding device shown in FIG. 1.

In FIG. 13, the wavelet decoding device for a picture includes an entropy decoding unit 6 for being fed with and reading out the encoded bitstream, a dequantizer 7 for dequantizing the produced quantization coefficients and a back-scanning unit 8 for back-scanning the produced transform coefficients to restore the original coefficient sequence. The wavelet decoding device also includes an inverse wavelet transform unit 9 for inverse wavelet transforming back-scanned coefficients to generate a tile picture, and a tile synthesizing unit 10 for synthesizing produced tile pictures to furnish an ultimate output picture.

The operation is hereinafter explained. The entropy decoding unit 6, fed with an encoded bitstream 105, effects entropy decoding by pre-set means to send out quantization coefficients 104. It is noted that entropy decoding means needs to be a counterpart of the entropy encoding means explained in the first embodiment. The entropy decoding means may be exemplified by variable length decoding means and arithmetic decoding means.

The quantization coefficients 104 are sent to the dequantization means 7 where dequantization is effected to generate and output transform coefficients 106. The dequantization means may be a routinely used scalar dequantizer represented by the following equation (2):

$$x = Q \times \Delta \qquad (2)$$

where Q and Δ denote a quantization coefficient value and a quantization index value, respectively.

The transform coefficients 106 are back-scanned in the back-scanning unit 8 which then outputs as-scanned wavelet transform coefficients 107. The as-scanned wavelet transform coefficients 107 are inverse-transformed in the inverse wavelet transform unit 9 from which the tile picture 108 is outputted. Finally, plural tile pictures 108 are synthesized to output a synthesized picture 109. The foregoing is the basic operation of the decoding device of the present embodiment.

Figure 14:
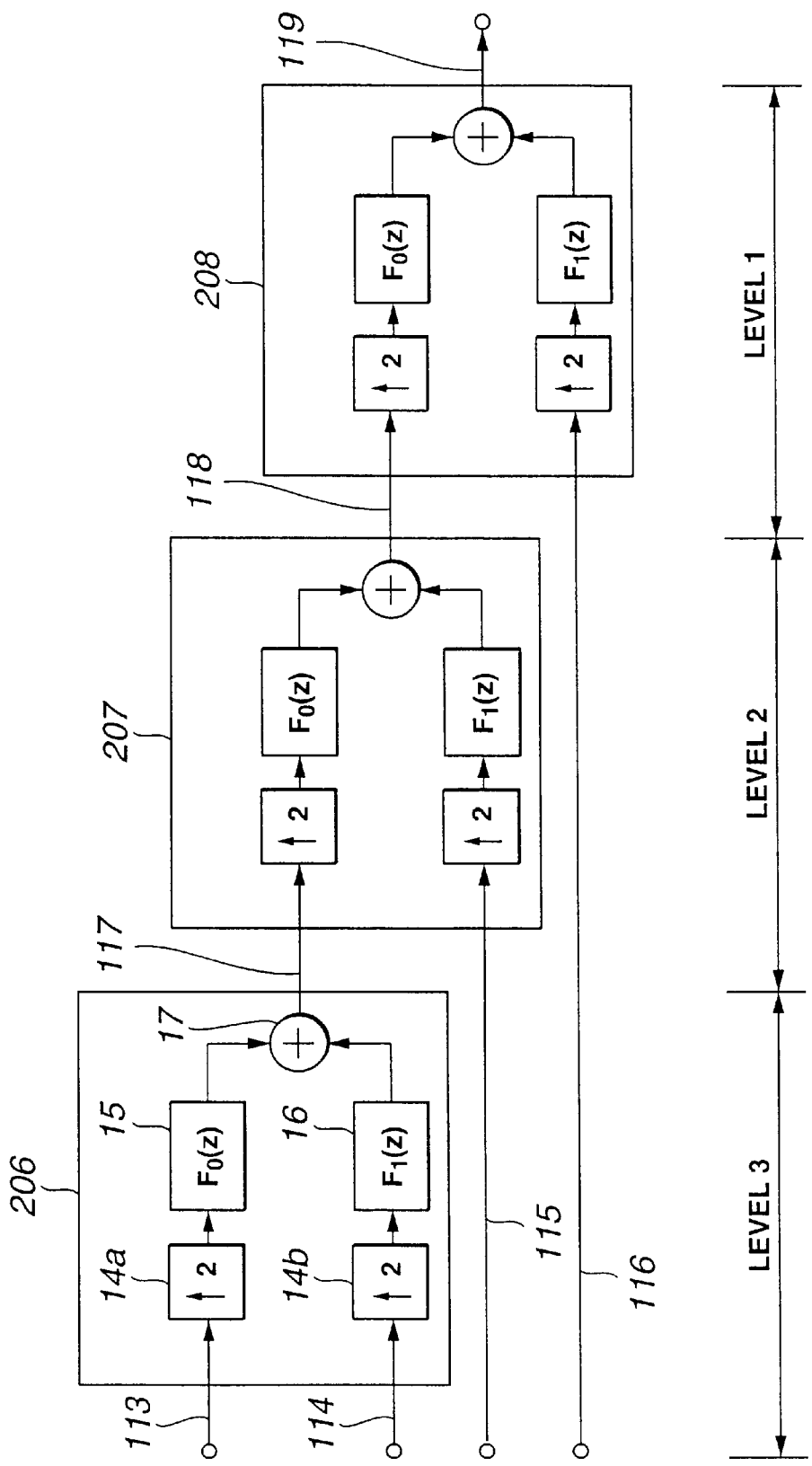
FIG. 14 is a block diagram showing the schematic structure of a routine inverse wavelet transform unit.

Referring to FIG. 14, the structure of the routine inverse wavelet transform unit 9 is explained.

The band components 113, 114, 115, 116, outputted by the wavelet transform unit 2, are inputted to the inverse wavelet transform unit 9. Referring to FIG. 14, the LLL component 113 and the LLH component 114 are upsampled to a two-times resolution by the upsamplers 14a and 14b, respectively. The low-range components and the high-range components then are filtered by the low-pass filter 15 and the high-pass filter 16, respectively. Both components are synthesized by an adder 17. The inverse transform, as a reverse operation of the transform of by the circuit 203 of the level 3 of FIG. 2, is completed by a circuit 206 comprised of the upsamplers 14a, 14b, filters 15, 16 and the adder 17, thus a LL component 117, as the low-range-side band component of the level 2, being produced. This processing then is repeated up to the level 1 to output an ultimate as-transformed decoded picture 119. The circuit 207 of the level 2 and the circuit 208 of the level 1 are configured similarly to the level 3 circuit 206, with an output of the level 3 circuit 206 and an output of the level 2 circuit 207 being routed as an input to the level 2 circuit 207 and as an output of the low-range side input to the level 1 circuit 208. The foregoing is the basic structure of the routine inverse wavelet transform unit 9.

FIG. 15 illustrates the decoding processing as a counterpart operation of the overlap tile-based wavelet encoding of FIG. 6. Referring to FIG. 15A, the encoded bitstream corresponding to a tile inclusive of the overlap portion is decoded, whereby the tile to be encoded and a portion outside the tile affected by filtering are decoded. This decoded portion is connected to neighboring tiles to produce a set of tiles reconstructed as shown in FIG. 15B to find an ultimate decoded picture.

A seventh embodiment of the present invention is explained.

This seventh embodiment is directed to inverse wavelet transform means used for wavelet decoding a picture described above. This inverse wavelet transform means symmetrically expands the wavelet transform coefficients in a tile to a region outside the tile affected by filtering to effect convolution. FIG. 16 shows a specified configuration.

Figures 16A, 16B, 16C, 16D:
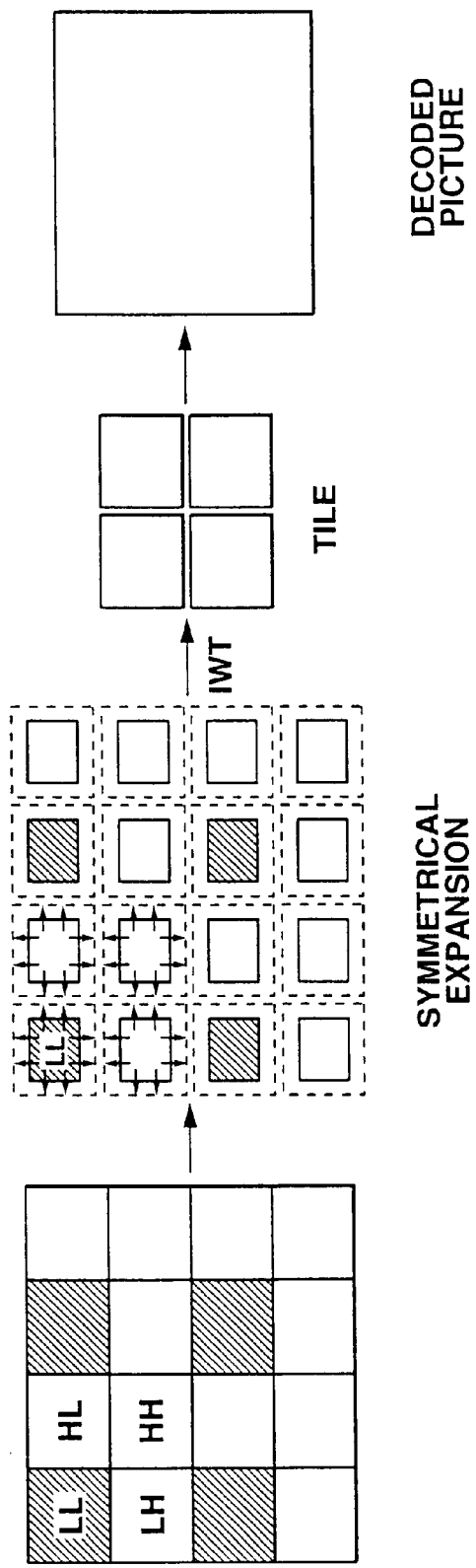
FIGS. 16A, 16B, 16C and 16D illustrate the concept of wavelet decoding by symmetrical convolution of wavelet transform coefficients.

Referring to FIG. 16A, wavelet transform coefficients of the four band components LL, LH, HL and HH are symmetrically expanded, as shown in FIG. 16B, and subjected to inverse wavelet transform (IWT). This decodes and outputs each tile picture, as shown in FIG. 16C. For the symmetrical expansion, it is sufficient if means explained in the second embodiment is used. It should, however, be noted that a, b, c, . . . of FIG. 10, meaning pixels in the explanation of the wavelet transform explained in the second embodiment, now mean wavelet transform coefficients insofar as the present inverse wavelet transform means is concerned.

One of the advantages of using the inverse wavelet transform means with symmetrical expansion is that inverse transform and decoding can be performed totally independently of ambient neighboring tiles. Also, if a higher bitrate (low compression ratio) is used, deterioration of the boundary portions between neighboring tiles can hardly be detected. By these features, the above-mentioned problems (i) and (ii) are overcome.

An eighth embodiment of the present invention is hereinafter explained.

In the present eighth embodiment, the wavelet transform means used is means for executing convolution with the totality of the wavelet transform coefficients outside the tile affected by filtering being set to 0. The operation of the present eighth embodiment is now explained.

Figures 17A, 17B, 17C, 17D:
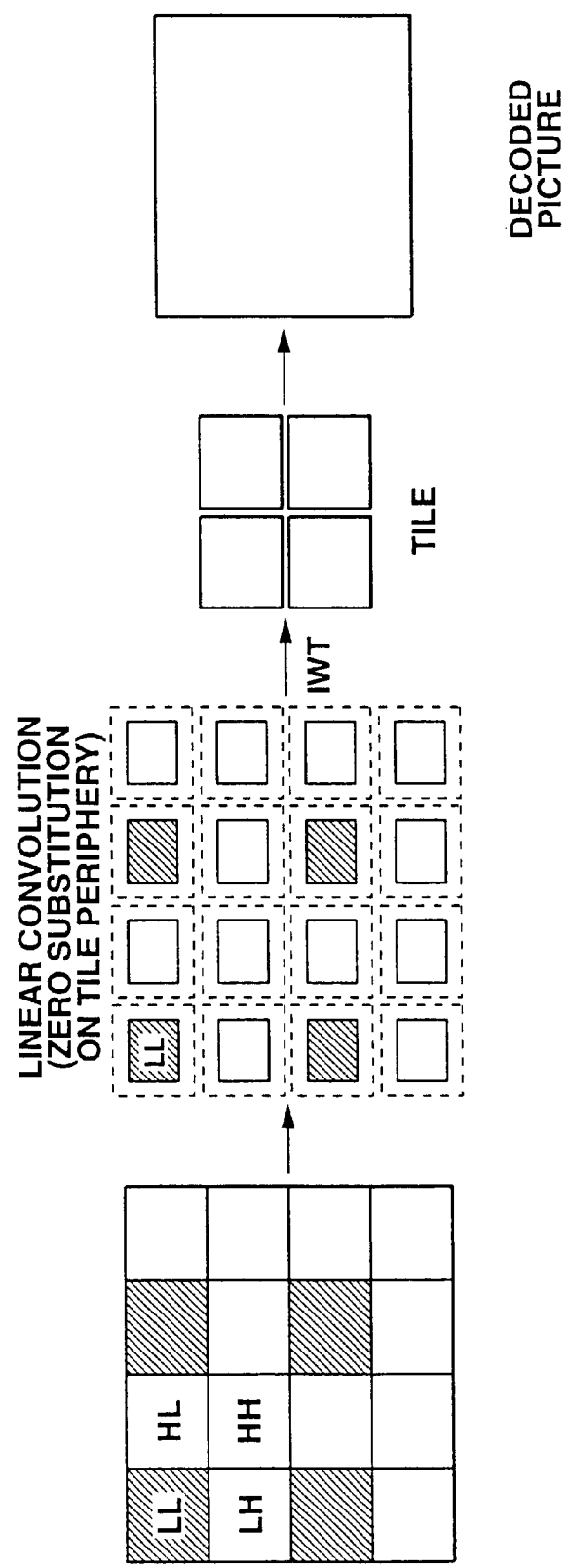
FIGS. 17A, 17B, 17C and 17D illustrates the concept of wavelet decoding by applying linear convolution of wavelet transform coefficients.

FIG. 17 specifically shows this operation. The wavelet transform coefficients of four band components LL, LH, HL and HH, shown in FIG. 17A, for example, are kept intact, and the wavelet transform coefficients outside the tile, affected by filtering, as indicated by a dotted line area, are all set to 0. In this state, the respective tiles are inverse wavelet transformed. This decodes and outputs respective tile pictures. The convolution of the inverse wavelet transform at this time is termed linear convolution.

Figure 18:
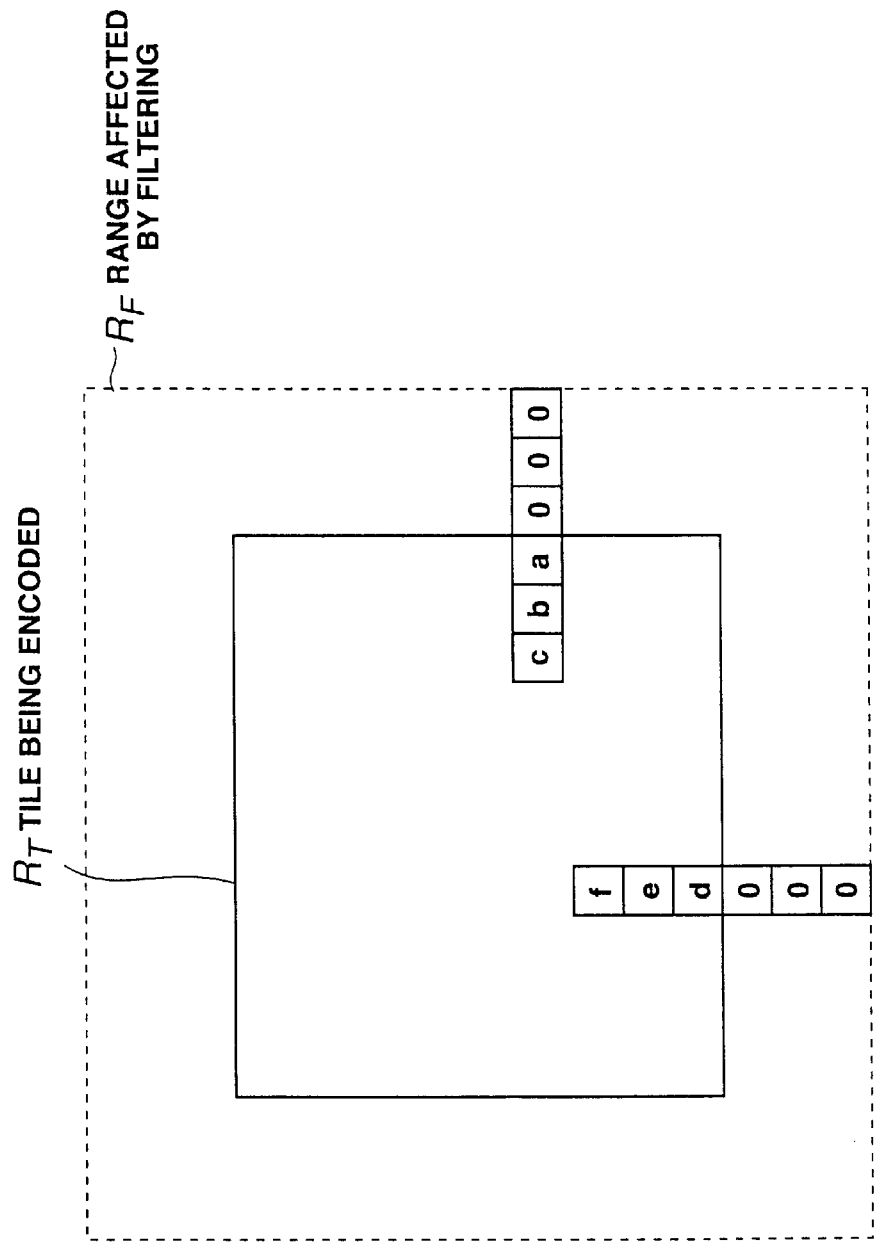
FIG. 18 is a diagrammatic view for illustrating the linear convolution.

Referring to FIG. 18, linear convolution means is explained.

On the outer sides of a tile RT to be encoded or decoded, in FIG. 18, pixels in a range RT affected by filtering in the horizontal direction are all set to 0, so that a pixel string in the horizontal direction shown is c, b, a, 0, 0, 0. On the other hand, pixels in a range RF affected by filtering in the vertical direction are all set to 0, so that a pixel string in the horizontal direction shown is f, e, d, 0, 0, 0. These pixels are convolved with wavelet filter coefficients to execute inverse wavelet transform.

This linear convolution has an advantage that a tile boundary portion is not detected even under a low bitrate (high compression). This is due to the fact that, by setting the coefficients in the boundary portion to the neighboring tiles to 0 for uniformity, smooth junction in the boundary portion can be achieved under the meritorious effect of linear interpolation by wavelet filtering.

Another advantage is that, in this inverse wavelet transform means, there is no necessity of reading out wavelet transform coefficients of neighboring tiles with overlap, such that inverse transform and decoding can be achieved totally independently of ambient neighboring tiles.

Thus, inverse wavelet transform means, in which wavelet transform coefficients in a range outside the current tile affected by filtering are all set to 0 to effect convolution, is excellent in the realization of both the high picture quality under high compression and partial tile decoding.

A ninth embodiment of the present invention is hereinafter explained.

The present ninth embodiment uses inverse wavelet transform means by symmetrical expansion and convolution as in the seventh embodiment in case of the low compression ratio in the wavelet decoding, while using inverse wavelet transform means by 0-value inserting linear convolution as in the eighth embodiment in case of the high compression ratio in wavelet decoding. This realizes a decoded picture of high picture quality in which distortion in the tile boundary portion cannot be detected irrespective of the compression ratio.

Meanwhile, the loss-free decoding can be achieved by employing inverse wavelet transform means by the symmetrical expansion and convolution of the seventh embodiment.

A tenth embodiment of the present invention is hereinafter explained.

In the wavelet encoding/decoding for a picture, in the present tenth embodiment, in which a picture is split into tiles and subjected to wavelet transform from tile to tile, the tile has no overlapping area to neighboring tiles, there being provided convolution means for symmetrically expanding wavelet transform coefficients in the inside of the tile to a region outside the tile affected by filtering in order to effect convolution. In an associated inverse wavelet transform means, there are provided means for symmetrically expanding the wavelet transform coefficients in the inside of the tile for convolution, and means for setting wavelet transform coefficients in a range outside the tile affected by filtering to 0 for convolution.

That is, in this tenth embodiment, wavelet transform means in the wavelet encoding used is means for symmetrical expansion of pixels in the tile to a range outside the tile affected by filtering for convolution, or means for setting the wavelet transform coefficients outside the tile affected by filtering to 0 for convolution.

That is, the present tenth embodiment uses, as wavelet transform means in wavelet encoding, means for symmetrically expanding pixels inside the tile to a range outside the tile affected by filtering to effect convolution (symmetrical convolution of wavelet transform coefficients), while using, as inverse wavelet transform means in a decoder, means for setting the wavelet transform coefficients outside the tile affected by filtering all to 0 to effect convolution (linear convolution of wavelet transform coefficients). This realizes matching between wavelet transform means and inverse wavelet transform means and hence high-efficient encoding and decoding with high picture quality.

An eleventh embodiment of the present invention is hereinafter explained.

The present eleventh embodiment uses, in wavelet decoding a picture, such a tile picture devoid of an overlapping portion between neighboring tile pictures. This eleventh embodiment, employing an integer precision type inverse wavelet transform (I-IWT), in turn employing lifting means, is explained with reference to FIG. 19.

Figure 19:
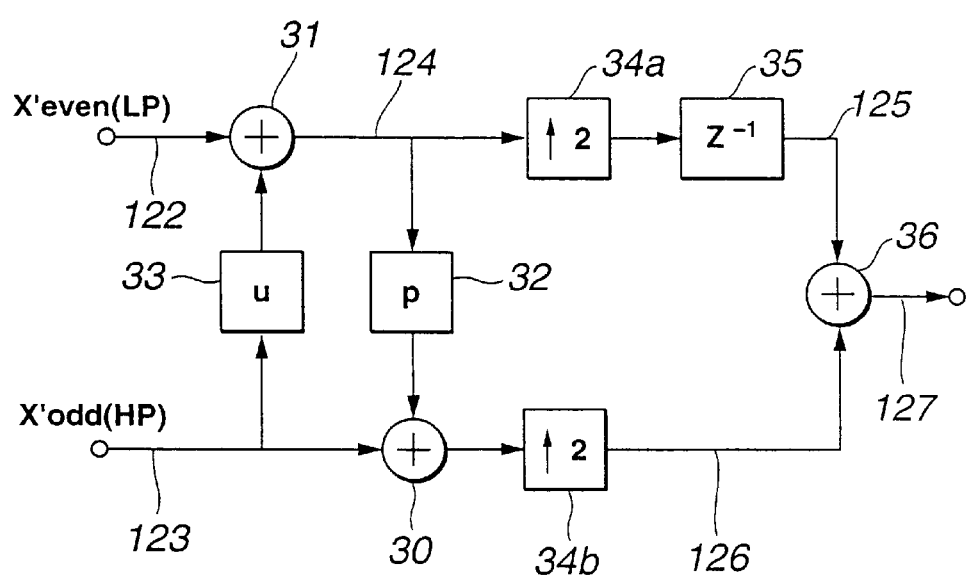
FIG. 19 is a block diagram showing the schematic structure of the integer precision type inverse wavelet transform unit.

The inverse wavelet transform means, shown in FIG. 19, performs processing reversed from that of the wavelet transform means of FIG. 11, explained as the third embodiment, and is fed with an output signal 122 on the low-range side (LP), outputted by the wavelet transform unit of FIG. 11, and with an output signal 123 on the high-range side (HP). The output signal 122 on the LP side is routed to a subtractor 31 where a difference from the output signal 123 obtained via a filter 33 having the coefficient string u to produce an output signal 123 which is routed to a 2-times upsampling 34a. The output signal 123 is also sent to an adder 30 where it is summed to the output signal 124 obtained via a filter 32 with a coefficient string p. The resulting sum signal is sent to a 2-times upsampler 34b. An output of the upsampler 34a is time-delayed by the delay unit 35 to yield an output 124 which is sent to an adder 36 where it is summed to an output of the upsampler 34b so as to be taken out as an ultimate output 127.

As discussed in the above-described third embodiment, the overlap tile-based wavelet decoding takes a sum with overlapping areas of neighboring tiles, thus affecting pixel values in these areas due to rounding errors by the filtering by p and u. Thus, with an increasing compression ratio, deterioration in the overlapping areas becomes outstanding. Conversely, with the present eleventh embodiment, in which, even though the integer-precision wavelet transform (IWT) and I-IWT are used on the encoding and decoding sides, respectively, overlapping is not used, thus allowing to evade the above-mentioned problem. That is, the present eleventh embodiment has high affinity to the integer type wavelet transform.

Meanwhile, the present wavelet decoding can be applied not only to symmetrical expansion of wavelet transform coefficients in the tile followed by convolution (symmetrical convolution of wavelet transform coefficients), as in the seventh embodiment, but also to setting the wavelet transform coefficients outside the tile influenced by filtering to 0, as in the eighth embodiment, followed by convolution (linear convolution of wavelet transform coefficients), as in the eighth embodiment.

A twelfth embodiment of the present invention is hereinafter explained.

The present twelfth embodiment includes, for wavelet encoding, integer-precision filtering and lifting means, as wavelet transform means as its constituent element, and effects loss-free compression, by omitting quantization means. On the other hand, for wavelet decoding, an loss-free compressed encoded bitstream is inputted and, for loss-free decoding, inverse wavelet transform means is used by symmetrical expansion and convolution. In case of lossy decoding, there is used inverse wavelet transform means by symmetrical expansion and convolution, as described above or insertion of 0 values into transform coefficients outside the tile, followed by convolution.

Meanwhile, the present twelfth embodiment resides in the combination of the encoding device and the decoding device in which, in particular, loss-free compression employing the integer-precision filter and lifting means of the third embodiment is performed on the encoding device, and in which the generated encoded bitstream is decoded by a wavelet decoder in a loss-free manner at a pre-set bitrate.

Since the wavelet transform means in the present embodiment performs symmetrical expansion of pixels, followed by convolution, loss-free decoding can be achieved impeccably if the decoder performs inverse wavelet transform of the symmetrical expansion of wavelet transform coefficients followed by convolution. If it is desired on the decoder side to effect lossy decoding at a pre-set bitrate, it is sufficient if the inverse wavelet transform of the convolution of symmetrically expanded wavelet transform coefficients or the inverse wavelet transform of 0-value substitution into transform coefficients outside the tile followed by convolution is selectively used. It is however advisable that inverse wavelet transform means by convolution of symmetrically expanded coefficients as explained in connection with the seventh embodiment be used for a low compression ratio and that inverse wavelet transform means by 0-value substitution into transform coefficients outside the tile followed by convolution as explained in connection with the eighth embodiment be used for a high compression ratio.

A thirteenth embodiment of the present invention is hereinafter explained.

In the present thirteenth embodiment, convolution means of filters of the seventh and eighth embodiments are used in a switching fashion depending on the number of wavelet splitting levels.

That is, if a picture is wavelength-split up to the number of levels of four by the wavelet transform means provided on the encoding side, the previous embodiments use the same convolution means in the inverse wavelet transform means on the decoder side, for any of the four levels, for example, symmetrical convolution means of the seventh embodiment or the linear convolution means of the eighth embodiment.

In the present thirteenth embodiment, the symmetrical convolution means of the seventh embodiment is used up to the number of splitting levels of three, whilst linear convolution means is used for the last level four splitting. This assures matching between the transform means and the inverse transform means, up to the number of level of three, if the wavelet transform means uses symmetrical expansion and convolution means.

On the other hand, it is possible to prevent deterioration in the neighboring portions of the tile pictures, by using linear convolution means at the last level, as described above. Thus, with the present embodiment, consisting in the above-described combination, high picture quality may be maintained, even under high compression, as the amount of the memory used is suppressed.

The manner of using the two sorts of the convolution means may also be reversed, that is, linear convolution means may be used up to a pre-set splitting level, with the symmetrical convolution means being used for subsequent splitting level(s).

The above-described embodiments of the present invention find the application in, for example, a encoder and a decoder for pictures for an electronic camera, portable or mobile unit (PDA) or a printer, satellite pictures or medical pictures, software modules therefor, textures used in games or three-dimensional CG, and so forth.

The present invention is not limited to the above-described embodiments and may be modified within the scope of the invention as defined in the claims.

What claimed is:

1. A wavelet decoding apparatus, comprising:
   means for transforming an encoded bitstream into wavelet coefficients;
   means for inverse wavelet transforming said wavelet coefficients to generate tile pictures; and
   means for synthesizing the generated tile pictures into an output picture;

wherein said inverse wavelet transforming means includes a first means for filtering said wavelet coefficients within each tile picture to symmetrically expand and convolve the coefficients to a range outside the tile picture, and a second means for setting wavelet coefficients in a range outside each tile picture to zero and for effecting convolution;

said inverse wavelet transforming means selecting said first means for loss-free decoding or said second means for lossy decoding.

2. A wavelet decoding apparatus, comprising:

means for transforming an encoded bitstream into wavelet coefficients;

means for inverse wavelet transforming said wavelet coefficients to generate tile pictures; and means for synthesizing the generated tile pictures into an output picture;

wherein said inverse wavelet transforming means includes a first means for filtering said wavelet coefficients within each tile picture to symmetrically expand and convolve the coefficients to a range outside the tile picture, and a second means for setting wavelet coefficients in a range outside each tile picture to zero and for effecting convolution;

said inverse wavelet transforming means selecting said first means or said second means on the basis of a number of wavelet splitting levels.

3. A wavelet decoding method, comprising the steps of:

transforming an encoded bitstream into wavelet coefficients;

inverse wavelet transforming said wavelet coefficients to generate tile pictures; and synthesizing the generated tile pictures into an output picture;

wherein said inverse wavelet transforming step includes a first step of filtering said wavelet coefficients within each tile picture to symmetrically expand and convolve the coefficients to a range outside the tile picture, and a second step of setting wavelet coefficients in a range outside each tile picture to zero and for effecting convolution;

said inverse wavelet transforming step performing said first step for loss-free decoding or said second step for lossy decoding.

4. A wavelet decoding method, comprising the steps of:

transforming an encoded bitstream into wavelet coefficients;

inverse wavelet transforming said wavelet coefficients to generate tile pictures; and synthesizing the generated tile pictures into an output picture;

wherein said inverse wavelet transforming step includes a first step of filtering said wavelet coefficients within each tile picture to symmetrically expand and convolve the coefficients to a range outside the tile picture, and a second step of setting wavelet coefficients in a range outside each tile picture to zero and for effecting convolution;

said inverse wavelet transforming step performing said first step or said second step on the basis of a number of wavelet splitting levels.

* * * * *